United States Patent [19]

Drexel et al.

[11] Patent Number: 5,509,302

[45] Date of Patent: Apr. 23, 1996

[54] MISFIRE DETECTION IN INTERNAL COMBUSTION ENGINES

[75] Inventors: Jeffrey R. Drexel, Rochester Hills; Larry T. Nitz, Rochester, both of Mich.

[73] Assignee: Saturn Corporation, Troy, Mich.

[21] Appl. No.: 236,812

[22] Filed: May 2, 1994

[51] Int. Cl.$^6$ ................................................ G01M 15/00
[52] U.S. Cl. ...................... 73/117.3; 364/431.08
[58] Field of Search .................... 73/116, 117.3; 123/419, 436; 364/431.07, 431.08

[56] References Cited

U.S. PATENT DOCUMENTS

| | | |
|---|---|---|
| 4,064,747 | 12/1977 | Rackliffe et al. . |
| 4,179,922 | 12/1979 | Bouverie et al. . |
| 4,295,363 | 10/1981 | Buck et al. . |
| 4,337,647 | 7/1982 | Radcliffe et al. . |
| 4,344,140 | 8/1982 | Leung . |
| 4,532,592 | 7/1985 | Citron et al. . |
| 4,697,561 | 10/1987 | Citron . |
| 4,930,479 | 6/1990 | Osawa et al. ............... 123/436 |
| 4,936,277 | 6/1990 | Deutsch et al. ............ 123/436 |
| 5,041,979 | 8/1991 | Hirka et al. ................. 73/116 |
| 5,086,741 | 2/1992 | Nakamura et al. .......... 123/419 |
| 5,214,958 | 6/1993 | Inada et al. ................. 73/117.3 |
| 5,237,504 | 8/1993 | Holmes et al. ............. 123/419 |
| 5,239,473 | 8/1993 | Ribbens et al. ............ 364/431.08 |
| 5,245,865 | 9/1993 | Kayanuma .................. 73/117.3 |
| 5,245,866 | 9/1993 | Hashiguchi et al. ........ 73/117.3 |
| 5,263,364 | 11/1993 | Nakayama et al. ......... 73/116 |
| 5,278,760 | 1/1994 | Ribbens et al. ............ 364/431.07 |

OTHER PUBLICATIONS

900232 "Methods of On–Board Misfire Detection" Plapp et al.

*Primary Examiner*—Richard Chilcot
*Assistant Examiner*—Eric S. McCall
*Attorney, Agent, or Firm*—Michael J. Bridges

[57] ABSTRACT

Internal combustion engine misfires are diagnosed through monitoring of change in engine speed wherein an acceleration spike index is generated for each cylinder event over a number of engine cycles in a test period and is corrected in accord with sensed part tolerancing, and wherein the corrected acceleration spike index is compared to at least one misfire threshold. For each engine cylinder, a degree of misfire severity is diagnosed at the end of the test period in accord with the frequency of excursions by the corresponding misfire index above the at least one misfire threshold.

7 Claims, 12 Drawing Sheets

MISFIRE DETECTION IN INTERNAL COMBUSTION ENGINES

FIELD OF THE INVENTION

The present invention relates to internal combustion engine diagnostics and, more particularly, to detection of misfire in internal combustion engines.

BACKGROUND OF THE INVENTION

Catalytic converters are commonly used with conventional internal combustion engines to reduce undesirable constituents in the exhaust gas thereof. The catalyst of these converters is destroyed by unburned fuel passing to, and combusting in a hot converter. Converter life expectancy and efficiency thus deteriorates when the engine passes unburned fuel through to the catalyst, such as when an ignition event fails to completely burn the fuel charge in a cylinder due to an engine misfire. Furthermore, as a catalytic converter converts engine emissions most efficiently when a stoichiometric mixture is properly combusted in the engine, misfires can reduce converter conversion efficiency and increase vehicle emissions.

It is therefore desirable to accurately detect and categorize engine misfires so that those misfires that contribute significantly to increased vehicle emissions or to potential catalytic converter damage may be corrected.

Engine misfire reduces the work output of the engine, causing a short period of deceleration after which the engine, through the work contribution of other combustion events, will accelerate to pre-misfire speeds. It has been proposed to compare engine speed in one cylinder firing event to a firing event in another cylinder, so as to provide a relative measure of work output. It is known to use an engine speed sensor, such as a position encoder, to monitor the relative average speed between consecutive cylinder events, for the purpose of measuring this relative work. Such position encoders typically take the form of a wheel, with a number of teeth disposed at substantially equi-angular positions about its circumference. The wheel is disposed on the engine such that it rotates at an angular velocity proportional to the angular velocity of the engine output shaft.

The difficulty with detecting misfires according to the relative work product of consecutive cylinder combustion events is that, especially at high engine speeds, engine speed is more sensitive to disturbances as a single engine speed disturbance, such as a misfire, can result in significant deceleration over more than one cylinder event.

Additionally, engine speed disturbances, such as caused by passing over substantially uneven driving surfaces or by driveline ringing following a significant acceleration can affect engine speed in much the same way as a typical misfire. It has been proposed to attempt to detect engine speed disturbances tending to lead to a misdiagnosis of an engine misfire, and to disable the misfire detector for the duration of such disturbances. However, this action restricts the scope of misfire detection coverage, and complicates the system by requiring addition of disturbance detection apparatus to the system. Furthermore, at high speeds, even slight variation in the distance between teeth on the position encoding wheel can produce significant measurement error which may reduce the integrity of the misfire detecting system. Additionally, the proposed approaches may require sophisticated signal filtering processes in order to diagnose multiple misfires occurring over consecutive engine cylinder events.

SUMMARY OF THE INVENTION

The present invention provides the desirable benefits by analyzing variations in engine speed so as to detect an engine speed change signature particular to misfiring engine cylinders, and not to other engine speed disturbances.

More specifically, the engine speed between successive engine cylinder events is monitored to detect when a pattern of an engine speed variation corresponding to a predetermined variation is present. When a corresponding speed variation is detected, a misfire is recorded. The predetermined variation may be described as an acceleration spike which, for the present invention, is a significant engine speed decrease corresponding to a misfiring combustion event followed by a significant engine speed increase for the next consecutive combustion event. The specific character of this variation sets it apart markedly from other engine speed disturbances, such as may originate from "normal" engine speed changes, from driving over rough roads, or from shifting and clutching activities. The robustness of the acceleration spike allows it to be used over the entire engine torque, speed-load range, and also allows it to diagnose more than one misfire in a single engine cycle over that range.

In a further aspect of this invention, a tooth correction term is appended to the acceleration spike to reduce sensitivity to manufacturing tolerances in the toothed wheel from which the engine speed variation information is derived.

Accordingly, through the present invention, engine misfires are reliably detected over a broadened engine operating range which includes traditionally difficult operating regions. Consecutive misfires may each be detected without use of sophisticated filtering processes. Sensitivity to toothed wheel manufacturing tolerances is significantly reduced.

DESCRIPTION OF THE DRAWINGS

The above and other aspects of the invention will become more apparent from the following description taken in conjunction with the accompanying drawings wherein.

DESCRIPTION OF THE PREFERRED EMBODIMENT

Figure 1:
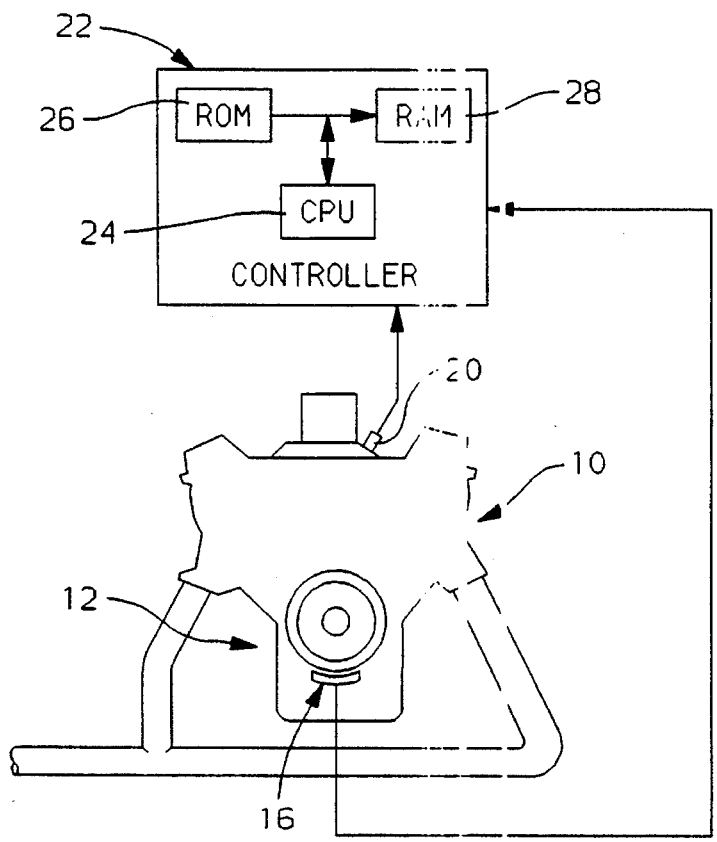
FIG. 1 is a general diagram of the hardware used in carrying out this invention in accord with a preferred embodiment.

Referring to FIG. 1, an internal combustion engine 10 having a crankshaft 12 communicates passage of a plurality of teeth disposed about the circumference of the crankshaft 12 by a conventional wheel speed sensor, such as a variable reluctance sensor 16. The sensor 16 is in position to have a magnetic field generated by the sensor disrupted in a predictable manner by the passage of the teeth. A substantially sinusoidal voltage thus is induced across the sensor with a frequency proportional to the rate of passage of teeth by the sensor 16, which is proportional to the rate of rotation of the crankshaft 12. In this embodiment, two teeth are disposed on the crankshaft in position to pass the sensor 16, such that with the four cycle, four cylinder engine of this embodiment, four teeth pass the sensor 16 for each engine cycle, or one per cylinder power stroke. The sensor 16 output is communicated to an engine controller 22.

A manifold absolute pressure MAP sensor 20 is located in the intake manifold of the engine and communicates MAP to the engine controller 22, for use in the routines of FIGS. 2–7. In an alternative embodiment, a mass airflow sensor (not shown) may be used to measure the mass of air inlet to the engine 10, for example to determine engine load, which is amount of air the engine consumes per cylinder event.

The controller may be an eight bit, single-chip microcomputer, such as a Motorola MC68HC11, having read only memory ROM 26, random access memory RAM 28, and a central processing unit CPU 24. The CPU 24 executes a series of programs to read, condition, and store inputs from vehicle sensors and, with the information provided by the inputs, manage operation of the vehicle.

Among the programs used for vehicle management are those illustrated in FIGS. 2–12. These routines, in accord with this invention, analyze the crankshaft sensor 16 output to determine if the engine is properly combusting its air/fuel charge on a cylinder by cylinder basis.

Figure 2:
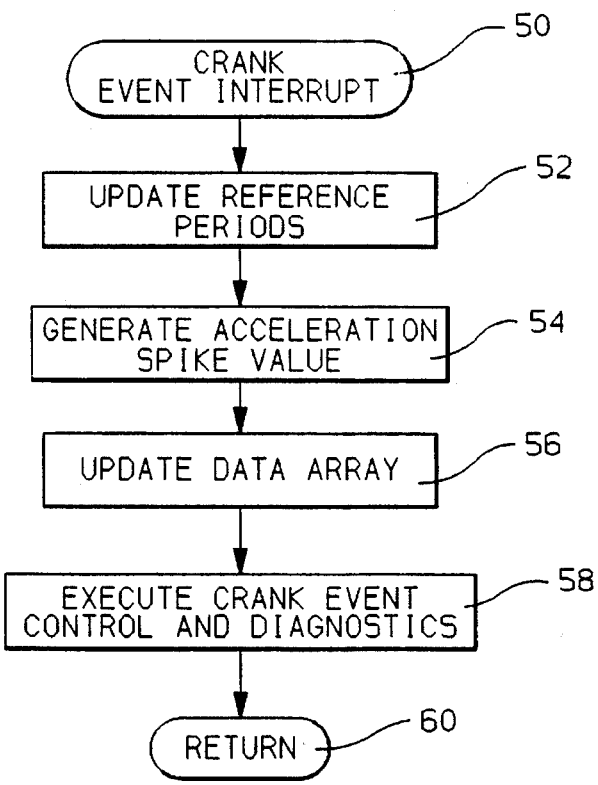
FIGS. 2–12 are computer flow diagrams illustrating the steps involved in executing the preferred embodiment of this invention.

First among these programs is that of FIG. 2, which is executed beginning at a step 50 upon detection of an engine crank event, such as may correspond to a cylinder event in the engine. For example, an engine crank event may be set up to occur each time the periodic crankshaft signal from sensor 16 cycles, at a time in each cycle corresponding to a combustion event in a corresponding cylinder. As such, in the four cylinder, four cycle engine of this embodiment, a crank event will occur once for each combustion event in the engine. Upon occurrence of each such event, the controller 22 (FIG. 1) is configured to vector control to the interrupt service routine of FIG. 2, to appropriately service the interrupt and to carry out engine control and diagnostic routines, including routines that contribute to the misfire diagnostic of the present embodiment.

Figure 3:
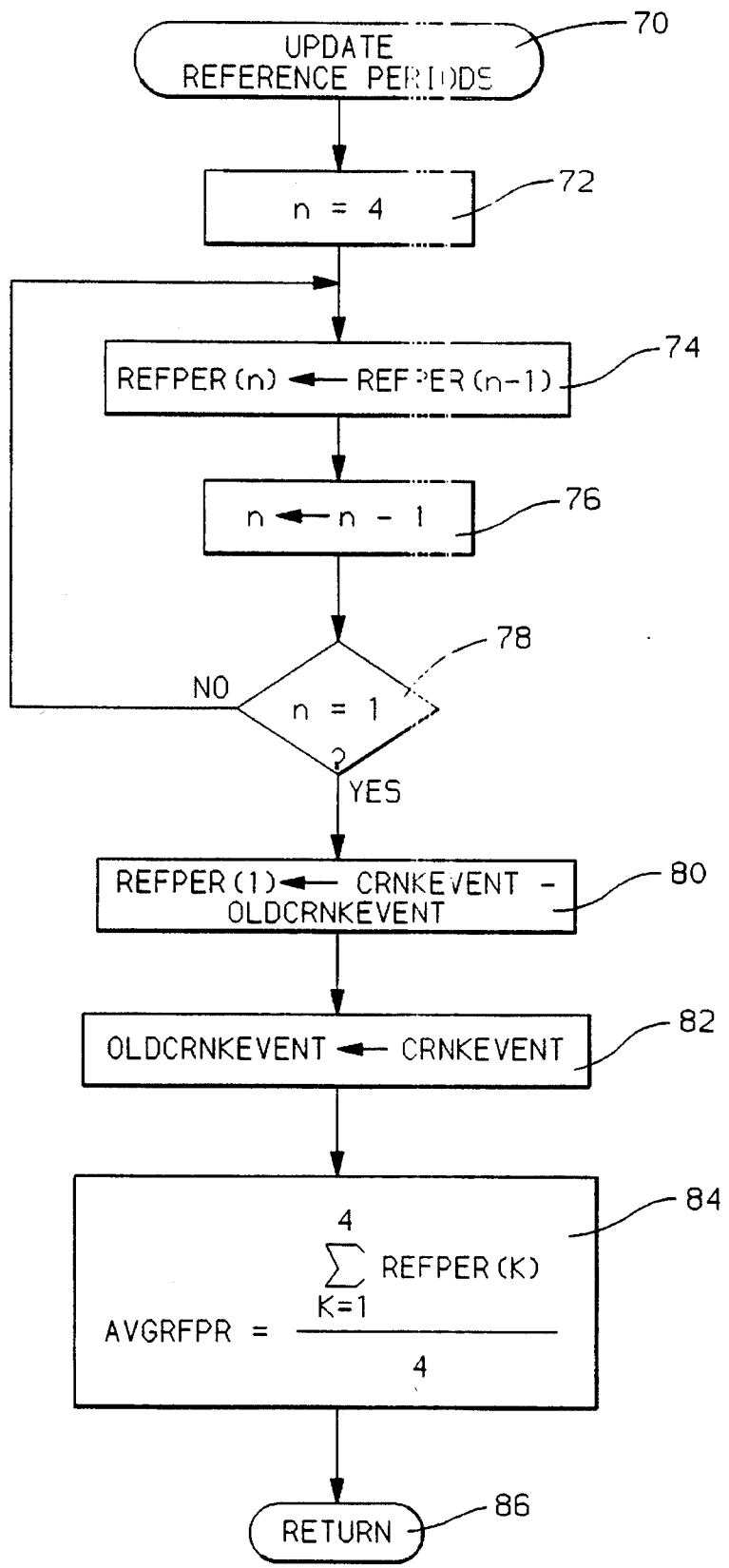
Figure 6:
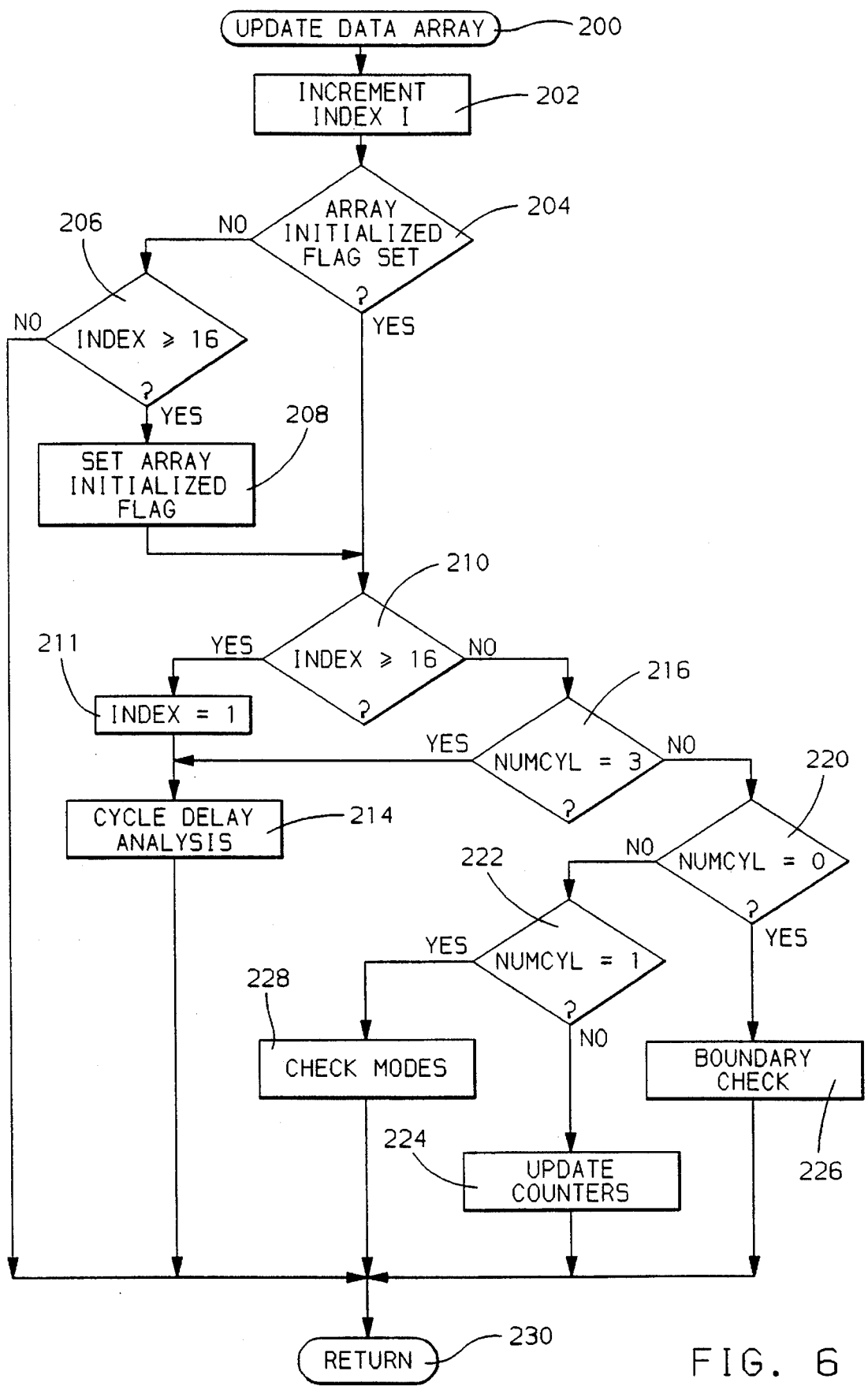

Returning to FIG. 2, upon detecting the crank event, the controller 22 (FIG. 1) is configured to execute the routine of FIG. 2, starting at the step 50 and proceeding to a step 52, at which a routine to update reference periods, illustrated herein as FIG. 3, to be described, is executed. After executing the routine to update reference periods via the step 52, the routine of FIG. 2 proceeds to a step 54 to execute a routine to generate an acceleration spike value, illustrated herein as FIG. 4, to be described. Next in FIG. 2, a step 56 is executed at which a routine to update a data array is called. The routine to update the data array is illustrated in FIG. 6, to be described.

The routine of FIG. 2 next proceeds to a step 58 to execute any conventional crank event control and diagnostics functions that may be necessary in accord with conventional engine control and diagnostics practice. Specifically, conventional routines to control engine fuel and ignition may be executed as well as routines to carry out conventional engine diagnostics. Upon completion of any of such engine control and diagnostic routines needed during the present crank event interrupt, as outlined at the step 58, the routine of FIG. 2 proceeds to a step 60 to return to any operations that were ongoing prior to the occurrence of the present crank event. The routine of FIG. 2 will, as described, be periodically executed in the manner described to service engine crank event interrupts.

Referring to FIG. 3, the routine to update reference periods is illustrated. This routine maintains a series of four most recent consecutive time difference values, called REF-PER values, for use in accord with this embodiment. Specifically, at a step 72, an index value n is reset to four for use in the present routine and then steps 74 through 78 are executed to update the three most recent prior REFPER values so as to maintain the most recent REFPER values for later use in this embodiment. After executing the steps 74, 76 and 78, for the three most recent REFPER values, the routine proceeds to a step 80 to generate the present REFPER value, denoted by index 1, as the difference between the time of the present crank event CRNKEVENT and the time of the most recent prior crank event OLDCRNKEVENT. This time difference is representative of the speed of the engine during this most recent reference period.

After generating REFPER(1), the routine of FIG. 3 proceeds to a step 82 to store CRNKEVENT as OLD-CRNKEVENT, for use in the next iteration of this routine. The routine then proceeds to a step 84 to generate an average reference period value AVGRFPR as the average of the most recent four reference period values, as maintained through the routine of FIG. 3. After the step 84, the routine proceeds to a step 86 to return to the step 52 of the routine of FIG. 2 from which this routine was called.

Figure 4:
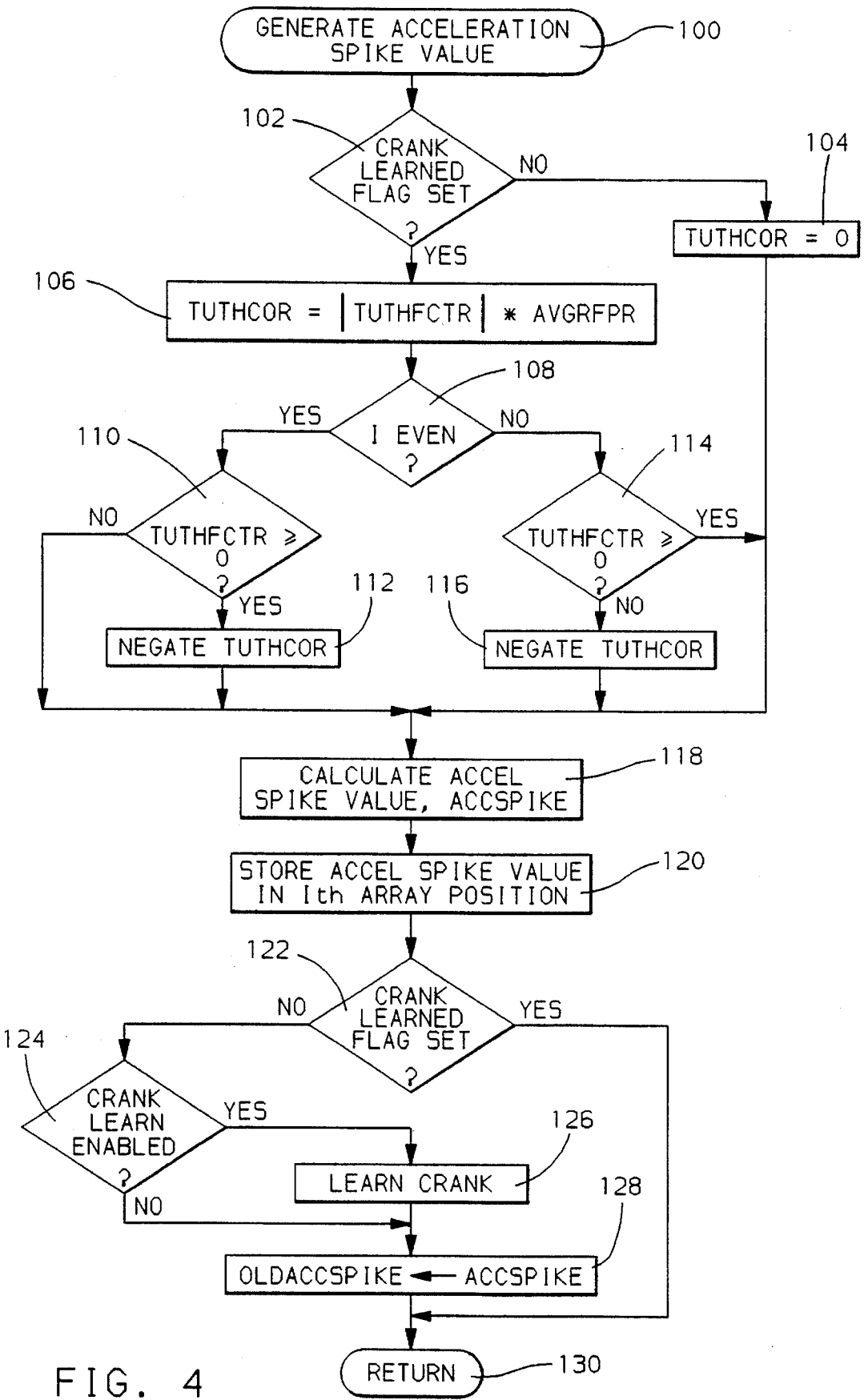

Turning to FIG. 4, the routine to generate an acceleration spike value is illustrated. An acceleration spike value is defined as a relatively large decrease in engine speed immediately followed by a significant increase in engine speed. Mathematically, the acceleration spike value is generated using reference period information from the most recent four reference period values, as described in FIG. 3, to magnify this acceleration spike information. When the acceleration spike information is thus magnified, it may be used to diagnose a misfire, and to distinguish the acceleration information from other engine acceleration sources such as driving over rough roads, or shifting or clutching of the powertrain by an operator.

Specifically, the routine of FIG. 4 is entered at a step 100 and proceeds to a step 102 to determine whether a crank learned flag has been set. The crank learned flag indicates whether the crank tooth error information required in accord with this embodiment has been learned for the particular crank shaft of this embodiment. As described, crankshaft tooth spacing variation sensitivity is reduced in accord with the present invention, by learning crank tooth error and by incorporating the learned crank tooth error into the misfire detection approach described herein. The crank tooth error learning may occur at initial operation of the engine 10, and may thereafter be relied on for misfire detection. For example, upon initially operating the engine, crank tooth learning may occur and a value representing crank tooth errors permanently stored for use, or at least stored until such time as crankshaft replacement may occur.

Returning to FIG. 4, if the crank learned flag is set at the step 102 indicating that the crank tooth error has been learned for the present embodiment, the routine proceeds to a step 106 to generate a tooth correction value as a product of the magnitude of the tooth factor, to be described, and the average reference period generated in FIG. 3. After generating the tooth correction value at the step 106, the routine proceeds to a step 108 to determine if an index value I is even.

Generally, the tooth correction provided in this embodiment may be positive or negative depending on which portion of the crankshaft the most recent reference value occurred over. The crankshaft of the present embodiment has two teeth disposed thereon. Any unevenness in the spacing of the two teeth will result in a bias between reference periods. The tooth correction value will attempt to account for such differences, and will change in sign for every other crank event. Accordingly, through the steps 108–116 of FIG. 4 sign correction is provided on every other crank event.

Specifically, at step 108 if the index I is even, the routine proceeds to a step 110 to determine if the tooth factor is greater or equal to zero. If the tooth factor is not greater or equal to zero, no sign correction is required and the routine proceeds directly to a step 118. Alternatively, if the tooth factor is greater or equal to zero sign correction needs to be applied, and the routine moves to a step 112, to negate TUTHCOR, after which the routine proceeds to the step 118.

Returning to step 108, if I is odd, sign correction may be required as well. Accordingly, the routine proceeds to step 114 to determine if tooth factor is greater than or equal to zero. If so, no sign correction is required and the routine proceeds directly to step 118. However, at the step 114, if tooth factor is less than zero the routine must carry out a sign correction to apply TUTHCOR properly, by proceeding to a step 116 to negate TUTHCOR, and then proceeds to the step 118.

After correcting the tooth correction value for sign errors, the step 118 calculates the acceleration spike value ACCSPIKE, as follows $$ACCSPIKE(K)=-REFPER(K)+3 * REFPER(K+1)- 3 * REFPER(K+2)+REFPER(K+3)+TUTHCOR$$

which is a simplified form of an equation that combines, with the tooth correction value, the magnitude of a deceleration corresponding to the cylinder responsible for the present crank event and the magnitude of the acceleration immediately following that deceleration. Accordingly, if that deceleration and the following acceleration were both relatively large in magnitude, the acceleration spike value ACCSPIKE would be substantially large, and may indicate an engine misfire, as will be described.

After generating the acceleration spike value at the step 118, the routine proceeds to a step 120 to store the acceleration spike value in the Ith array position in an array of sixteen acceleration spike values, as is needed for the present routine. The array of sixteen acceleration spike values will be used in determining a presence of any misfire in the engine, as will be described.

After storing acceleration spike value at the step 120, the routine of FIG. 4 proceeds to a step 122 to discern whether the crank learned flag has been set. If the flag is set, no crank tooth error learning is required, as described, and the routine proceeds to a step 130 to be described. Alternatively, if the crank learned flag is not set, then crank learning is required and the routine proceeds to a step 124 to determine if crank learn is enabled. Crank learn will be enabled, as will be described, when conditions are appropriate for crankshaft tooth error learning. If crank learning is enabled, then the routine proceeds to a step 126 to execute a routine illustrated in FIG. 5 to learn crank tooth error, as will be further detailed.

After executing the routine to learn crank, the routine of FIG. 4 proceeds to a step 128 to store ACCSPIKE, the presently determined acceleration spike value as OLD-ACCSPIKE, for later use, as will be described. Next, or if the crank learn flag was set at the step 122, the routine proceeds to a step 130 to return to the routine of FIG. 2, from which the routine of FIG. 4 was called.

Figure 5:
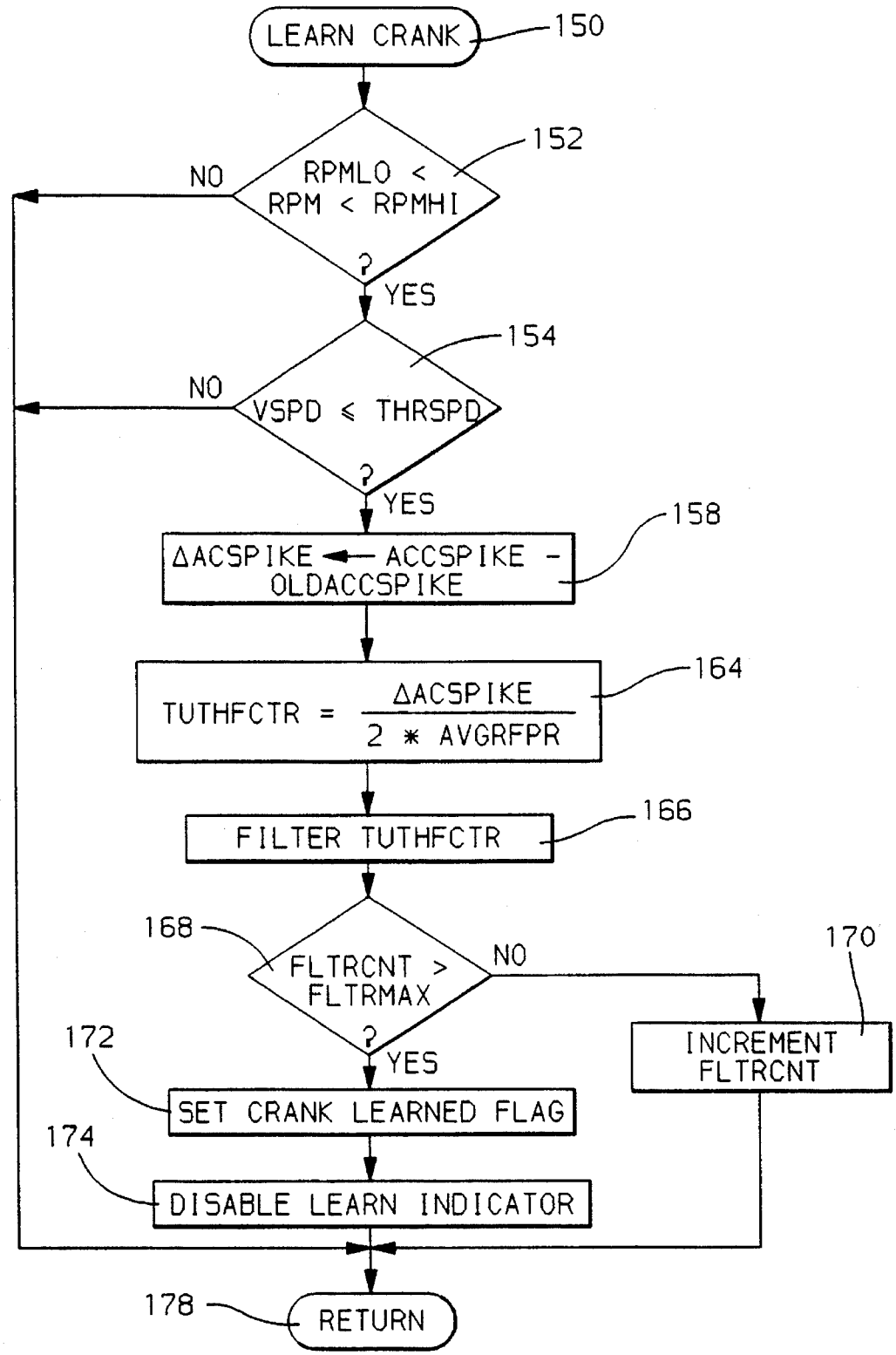

Referring to FIG. 5, the routine to learn crank tooth error is illustrated, as called from step 126 of FIG. 4, starting at the step 150. The routine proceeds from step 150 to a step 152 to compare engine speed RPM to an engine speed range defined by speed range boundary values RPMLO and RPMHI. In this embodiment, RPMLO may be set to 3,000 r.p.m. and RPMHI may be set to 4,000 r.p.m., between which is thereby defined a range of engine speeds within which a representative tooth learning value may be generated. If engine speed RPM is within the engine speed range at the step 152, the routine proceeds with the crank learning. Otherwise, the crank learning is not carried out and the routine of FIG. 5 is exited at a step 178 and returns to the described step 126 of FIG. 4 from which the present routine was invoked.

Returning to the step 152, if engine speed RPM is within the RPM range, the routine proceeds to the step 154 to compare vehicle speed VSPD to a threshold vehicle speed THRSPD. Vehicle speed may be generated through a conventional wheel speed sensor or through a conventional transmission cable o indicate the speed of motion of the vehicle within which the engine 10 is installed. The threshold speed THRSPD is calibrated to a small value slightly greater than zero speed. Therefore, the comparison at the step 154 is to determine if the vehicle is in neutral, or substantially not moving. In this embodiment, the crank learning routine of FIG. 5 is set up to learn tooth to tooth variations when the engine speed is within the described predetermined range and when the vehicle is in neutral, to improve the quality of the tooth learning information retrieved. If the vehicle is not determined to be in neutral at the step 154, the crank learning is disabled for the present crank event by proceeding to the described step 178.

Alternatively at the step 154, if the vehicle is determined to be in neutral, the routine proceeds with the crank learning by moving to a step 158 to generate a difference value ΔACSPIKE, as the difference between the present acceleration spike ACCSPIKE and the most recent determined acceleration spike OLDACCSPIKE. This difference value represents the acceleration spike difference due to crankshaft tooth-to-tooth variations.

After generating ΔACSPIKE at the step 158, the routine proceeds to a step 164 at which a tooth factor TUTHFCTR is generated as follows $$TUTHFCTR=\Delta ACSPIKE/(2*AVGRFPR)$$

wherein ΔACSPIKE values is halved so that it is the portion of the acceleration spike only to tooth error, and further is divided by the average reference period value AVRGFPR to normalize the tooth factor for engine speed.

After generating TUTHFCTR at the step 164, the routine of FIG. 5 proceeds to a step 166 to filter TUTHFCTR by passing it through a conventional lag filter process as is generally known in the art, to reduce the impact of signal and system noise on the precision of the estimate of the acceleration spike error. Next, the routine moves to a step 168 to compare a filter count FLTRCNT, which is the number of filter values applied in the lag filter process of step 166, to a maximum value FLTRMAX. The value FLTRMAX is set, in this embodiment, to approximately 400 to ensure that 400 tooth factors have gone into the filtering process of step 166 before a precise tooth factor is assumed to be present.

Accordingly, at the step 168, if FLTRCNT does not exceed FLTRMAX, the routine proceeds to a step 170 to increment FLTRCNT and then exits the routine of FIG. 5 at the described step 178. Alternatively, if FLTRCNT exceeds FLTRMAX at the step 168, the routine proceeds to a step 172 to set a crank learned flag, to indicate crank learning is complete, and then proceeds to a step 174 to disable any learn indicator that may have been present, such as an indicator to a technician that crank learning must yet be carried out to properly prepare the controller 22 (FIG. 1) for misfire detection. For example, a flashing light on the instrument panel of an automotive vehicle would indicate such a need for learning to the technician. Accordingly, upon learning crank information through the routine of FIG. 5 and after a sufficient number of tooth correction factors have gone into the filtering of TUTHFCTR, the learn indicator may be disabled at the step 174, and the routine exited via the described step 178.

Referring to FIG. 6, the routine to update the data array is described. When called from the described step 56 of the routine of FIG. 2, this routine starts at a step 200, and proceeds to a step 202 at which the index I is incremented to point to the next position in the sixteen entry data array of this embodiment. After incrementing the index, the routine proceeds to a step 204 to determine if an array initialized flag has been set.

If the array initialized flag is not set at the step 204, the routine proceeds to a step 206 to compare the index value I to the size of the data array of the present embodiment, which has been set to sixteen. If the index value exceeds or is equal to sixteen, the routine proceeds to a step 208 to set the array initialized flag to synchronize the operation of the routine of FIG. 6 to start at the beginning of the array pointed at by the index I. After setting the array initialized flag the routine proceeds to a step 210, to be described. Returning to step 206, if the index I is not greater than or equal to sixteen, the routine proceeds to a step 230 at which it is directed to return to the routine of FIG. 2 from which the routine of FIG. 6 was called.

Returning to the step 210, if the index I is greater than or equal to 16 indicating that the 16 entry data array of the present embodiment is full, the routine resets the index to one at a step 211 and then proceeds to a step 214 to execute a cycle delay analysis as will be described in FIG. 7, and then proceeds to step 230 to return to the routine of FIG. 2 from which the present routine was called. Alternatively at the step 210, if the index I is less than 16, a step 216 is executed at which the pointer NUMCYL is compared to the value three. NUMCYL indicates a position in the engine cylinder firing order and is maintained in a conventional engine control loop not described herein. Generally, NUMCYL starts at zero, and is incremented each time an engine cylinder event occurs, and returns to zero after reaching a value corresponding to the number of cylinders in the application. For example, in the four cylinder engine of this embodiment, NUMCYL would start at zero, and be incrementally increased to three, and then would restart at zero, etc.

Returning to the step 216, NUMCYL is compared to three to determine if present engine cylinder event interrupt was caused by the final cylinder firing event in the firing order. If so, the routine proceeds to the described step 214 to carry out the cycle delay analysis of FIG. 7. Alternatively at the step 216, if NUMCYL does not equal three, the routine proceeds to a step 220 to determine if NUMCYL equals zero, indicating the present interrupt corresponds to a cylinder event in the first cylinder in the firing order.

If NUMCYL equals zero at the step 220, the routine proceeds to a step 226 to carry out a boundary check as will be described in the routine of FIG. 9, and then proceeds to the described step 230. Alternatively at the step 220, if NUMCYL does not equal zero, the routine proceeds to a step 222 to determine if NUMCYL equals one, corresponding to the second cylinder of the firing order. If NUMCYL equals one at the step 222, the routine proceeds to a step 228 to check modes via the routine of FIG. 10, to be described. After executing the routine of FIG. 10, the routine of FIG. 6 proceeds to the described step 230.

Returning to the step 222, if NUMCYL does not equal one, the routine proceeds to a step 224 to execute a routine illustrated in FIGS. 8a and 8b, to update misfire counters, as will be described. After executing the routine of FIGS. 8a and 8b, the routine of FIG. 6 proceeds to the described step 230. As illustrated in the described routine of FIG. 6, distribution of the tasks supporting the misfire diagnostic of the present embodiment is provided, wherein certain of the tasks are carried out for each of the crank events of the engine cycle. In other words, the burden of carrying out all of the tasks required by the diagnostic of this embodiment is not levied on any one iteration of the present routine, but rather is divided among the four cylinder event interrupts of each engine cycle. This distribution provides for a sufficient amount of time for each of the tasks to be carried out on each cylinder event without constraining too significantly the throughput capabilities of the controller of this embodiment.

Figure 7:
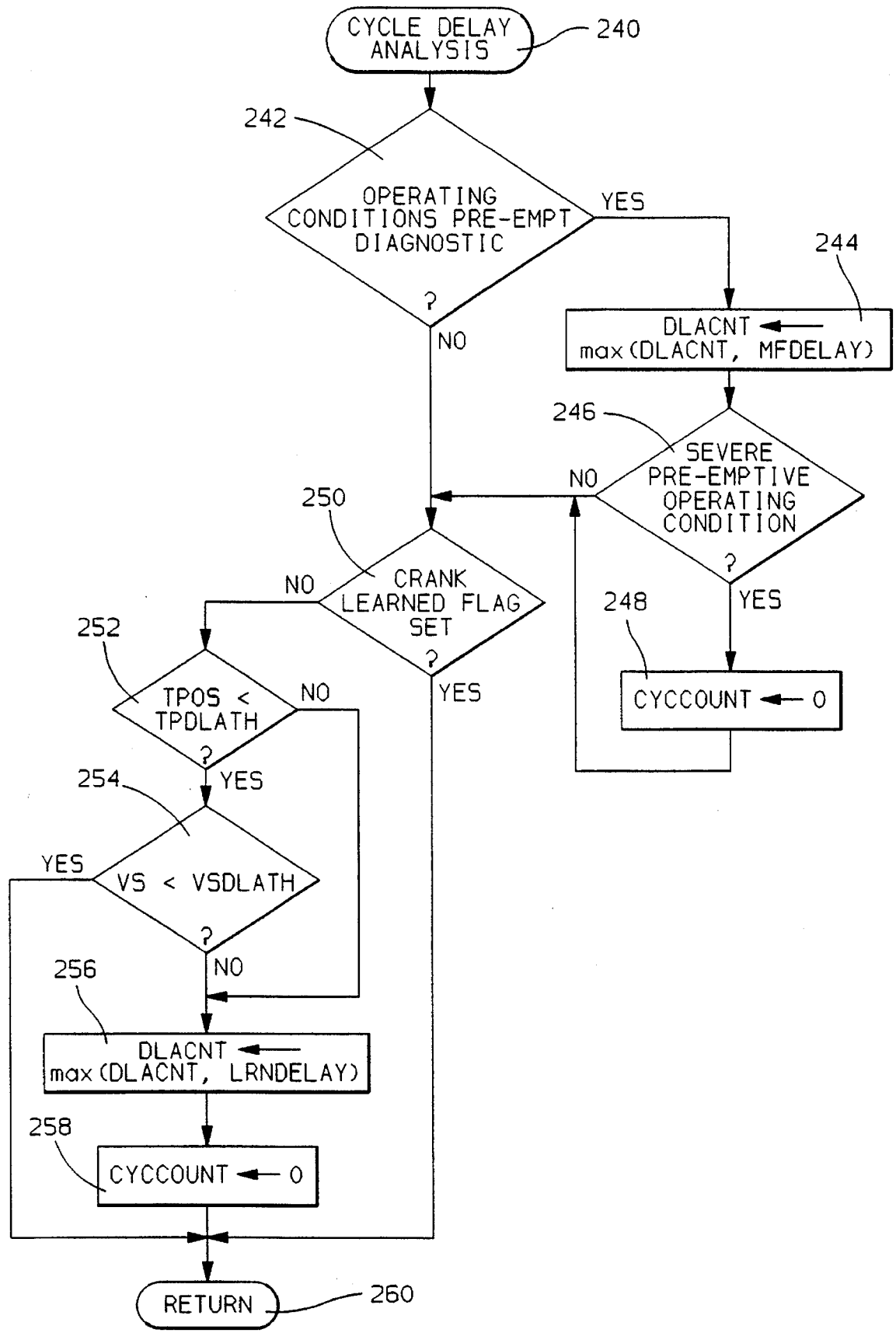

The cycle delay analysis routine is illustrated in FIG. 7, and is called at the described step 214 of the routine of FIG. 6. The cycle delay analysis routine generally monitors a set of engine and vehicle operating conditions that, if present, would interfere with the precision of this misfire diagnostic. If any such conditions are determined to be present in the cycle delay analysis routine, the misfire diagnostic of this embodiment is delayed by a predetermined time, wherein the predetermined time is set up to be sufficiently long to allow the condition to decay away, so that precise misfire diagnosis may continue.

Specifically, when called at the step 214 of the routine of FIG. 6, the routine of FIG. 7 is initiated, starting at a step 240 and proceeding to a step 242 to determine if any of a set of operating conditions are present that should preempt this misfire diagnostic. Such operating conditions include any engine condition under which engine fueling is disabled, any temporary fuel shut-off during a significant engine deceleration, any significant change in engine throttle position above a relatively high threshold change in throttle position, any conventional EGR diagnostic tests taking place wherein the EGR system may be operated in a diagnostic mode which may interfere with the accuracy of this misfire diagnostic, or any detected lack of synchronization between the camshaft position sensor and the crankshaft position sensor, which may be determined via a conventional engine diagnostic, not described herein.

If any of such operating conditions are present, the routine of FIG. 7 proceeds to a step 244 to set a delay value DLACNT to the larger of its current value or a misfire delay value which may be set to five counts, representing five engine cycles of delay in this embodiment. After setting DLACNT at the step 244, the routine proceeds to a step 246 to determine if the present pre-emptive operating conditions are of a severe nature such that their presence would tend to skew significantly any previous data recorded under the current misfire diagnostic test. Such severe operating conditions in this embodiment include a presence of negative engine output torque as may be detected in a conventional torque detection routine, not described herein.

If such negative engine output torque or other conventionally-known severe operating condition is detected at the step 246, the routine proceeds to a step 248 to clear the cycle counter CYCCOUNT which monitors the number of cycles that have been tested during the current misfire test. By resetting CYCCOUNT to zero at the step 248, a new misfire diagnostic test will be initiated including a new set of 100 engine cycles, as will be described. After resetting CYCCOUNT at the step 248 or if no severe pre-emptive operating condition was detected at the step 246, or if no pre-emptive operating conditions were detected at the step 242, the routine proceeds to a step 250 to determine if a crank learned flag has been set.

The crank learned flag indicates whether the tooth error for the crankshaft of the engine 10 (FIG. 1) of this embodiment has been learned, such as was described in the routine of FIG. 5. If the crank learned flag is set, the routine proceeds to a step 260 to return to the routine of FIG. 6 from which this routine was called. Alternatively at this step 250, if the crank learned flag is not set, the routine proceeds to steps 252–258, to determine if the engine is operating at idle, and to allow the present misfire diagnostic to continue if at idle despite a lack of crank tooth error learning.

Generally, the acceleration spike information relied on in this embodiment has associated with it a sensitivity to crank tooth error, as described. This sensitivity increases with increasing engine speed, wherein above a certain engine speed the acceleration spike signal to noise ratio has dropped to a level that obscures significantly misfire information. Returning to the FIG. 7, if the crank learned flag is not set at the step 250, the routine moves to a step 252 to compare engine throttle positions TPOS to a throttle position threshold TPDLATH. The throttle position threshold is set slightly higher than the zero throttle position so that a determination may be made at the step 252 as to whether throttle position is substantially at zero, indicating engine idle. If throttle position is determined to be substantially at zero at the step 252, which would be indicated by TPOS being less than TPDLATH, the routine proceeds to a step 254 to compare vehicle speed VS to a vehicle speed delay threshold VSDLATH which is set slightly higher than zero vehicle speed in this embodiment so that a determination may be made at the step 254 where as to whether the vehicle speed is substantially zero, indicating engine idle.

If vehicle speed is determined to be substantially zero at the step 254, as would be indicated by VS being less than VSDLATH the engine is assumed to be at or substantially close to idle that the misfire diagnostic may continue despite the absence of crank tooth error learning. Accordingly, the routine proceeds to the described step 260. Alternatively, if vehicle speed is not substantially zero as determined at the step 254 or if throttle position is not substantially zero as determined at the step 252, the engine is assumed to not be at or sufficiently near idle to allow the diagnostic to continue in the absence of crank tooth error learning, and thus the routine proceeds to a step 256 to reset the delay count DLACNT to the larger of its current value or to a learn delay value LRNDLAY set to five in this embodiment.

The routine then proceeds to a step 258 to reset the cycle counter CYCCOUNT to zero to begin a new test period of 100 engine cycles. Accordingly, if the crank tooth error has not been learned and, at any time during a diagnostic test, the engine deviates significantly from idle, the test will be discontinued, and not restarted until after a delay time. Returning to the step 258, after resetting CYCCOUNT to zero, the routine of FIG. 7 proceeds to the described step 260.

Figure 8A:
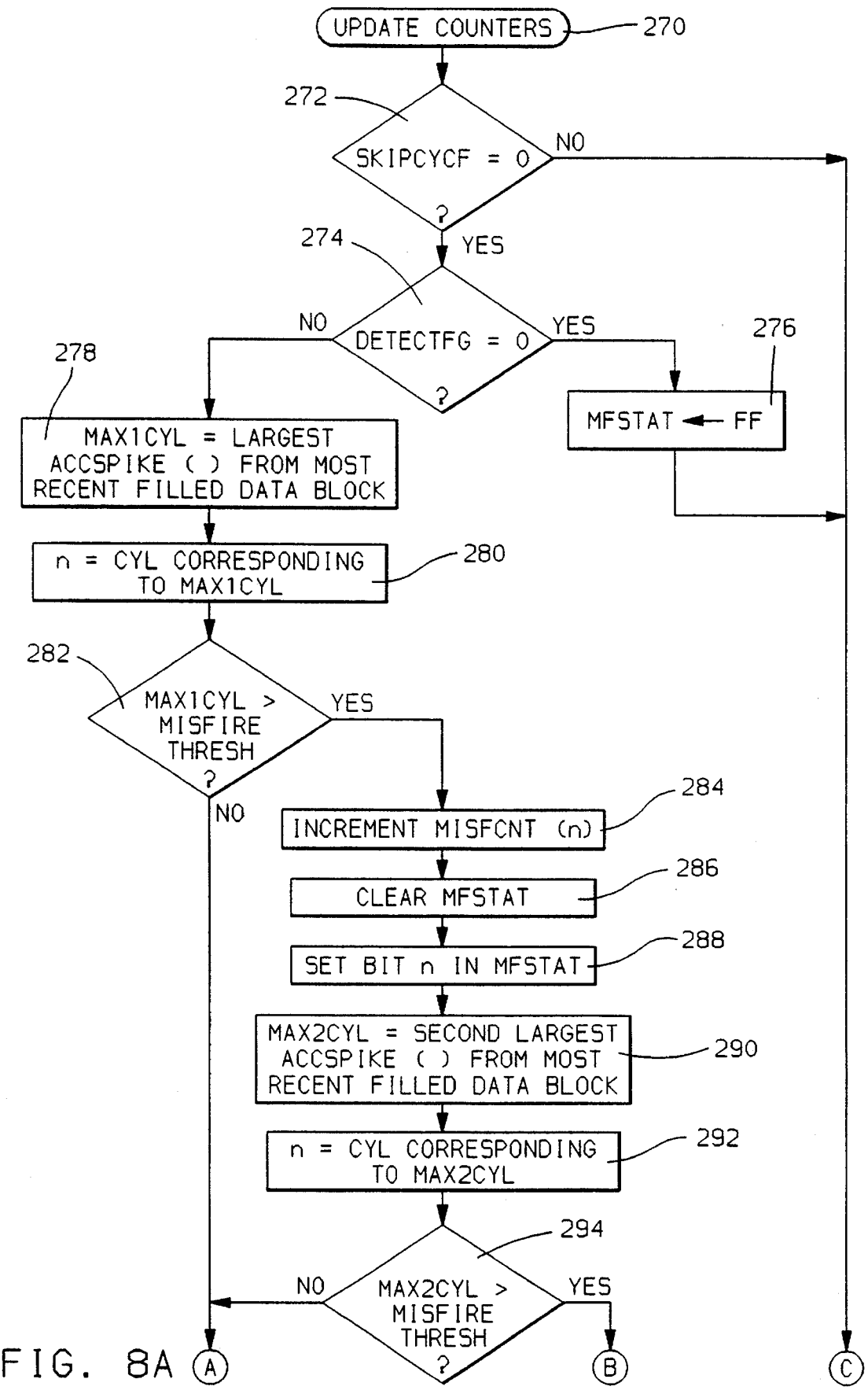
Figure 8B:
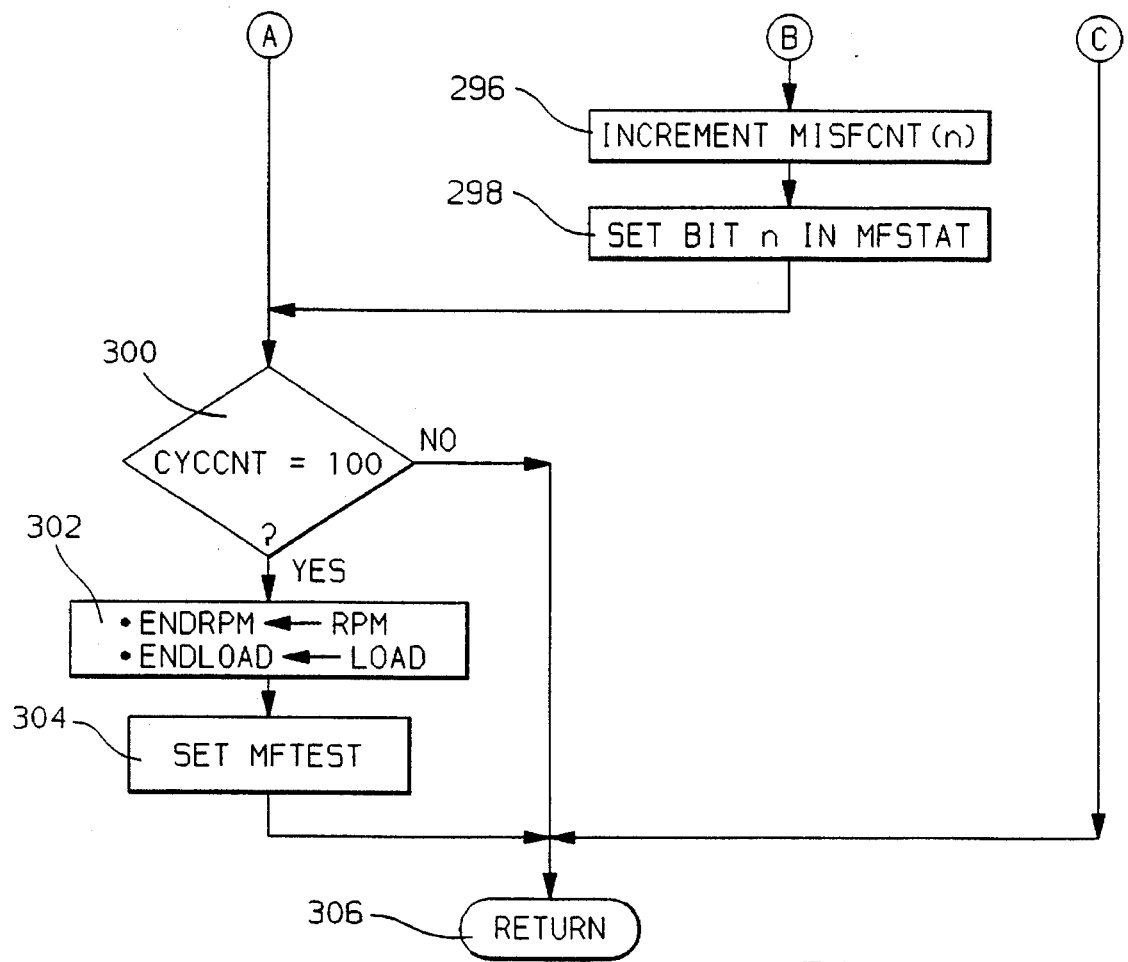

Referring to FIGS. 8a and 8b, the routine to update misfire counters is illustrated, as called at the described step 224 of the routine of FIG. 6. When called, the routine of FIG. 8a is initiated starting at a step 270 and proceeds to a step 272 to determine if a skip cycle flag is set. If the skip cycle flag is set, indicating that conditions are not appropriate to update the misfire counters, the routine proceeds to a step 306 where it is directed to return to the step 224 of the routine of FIG. 6.

If the skip cycle flag is not set at the step 272, the routine proceeds with the misfire counter update by moving to a step 274 to determine if a flag DETECTFG is clear. If this flag is clear at the step 274, it is assumed that misfires under the current engine operating conditions are not reliably detectable and the routine proceeds to a step 276 to set a misfire status word to hexadecimal value FF or all ones in an eight bit format, to indicate the detectability difficulty, and then proceeds to the described step 306.

However, if the detect flag is not clear at the step 274, the routine proceeds to a step 278 to determine a maximum acceleration spike value from the most recent filled block of four values in the sixteen entry array of acceleration spike values. The blocks contain four consecutive acceleration spike values. The first block contains the first four entries in the sixteen entry array, the second block contains the fifth through eighth entries in the sixteen entry array, etc. By way of explanation, the last block in the array, namely the thirteenth through sixteenth entries in the array, will be analyzed in this routine of FIGS. 8a and 8b after the array is filled and begins storing a new array over the old array, starting at the first block.

The maximum value from the set of four values in the most recent filled block indicates the cylinder having the most significant deceleration and subsequent acceleration i.e. acceleration spike, over that block which represents four consecutive cylinder events making up an engine cycle. The maximum value is selected at the step 278 for comparison to the misfire threshold value as determined at a step 372, to be described, to determine if the acceleration spike is sufficiently large to indicate an engine misfire.

Specifically, at the step 278, MAX1CYL is selected as the largest acceleration spike value for the most recent filled block of acceleration spike values. The routine then proceeds to a step 280 to set the value n to the cylinder number corresponding to that found largest or maximum acceleration spike value. The routine then proceeds to a step 282 to compare MAX1CYL to the misfire threshold value determined at a step 372 of the routine of FIG. 10, to be described.

If the maximum acceleration spike value exceeds the misfire threshold value, a misfire is assumed to have occurred for the nth cylinder, and the routine proceeds to a step 284 to increment a misfire counter MISFCNT(n) corresponding to that nth cylinder. Accordingly, any misfiring cylinder of the engine will have a corresponding count in accord with the present diagnostic of the number of misfires that have occurred over a test period, such as over the 100 engine cycle test period of the present embodiment. After incrementing the appropriate misfire counter corresponding to the cylinder n at the step 284, the routine proceeds to a step 286 to clear the status word MFSTAT which indicates most recent misfiring cylinder or cylinders.

The routine then proceeds to a step 288 to set the nth bit in MFSTAT, indicating that a misfire has been detected for the nth cylinder during the current crank event interrupt service routine, and next advances to a step 290 to determine the second highest acceleration spike value MAX2CYL over the most recent filled block of values in the sixteen entry array. The cylinder corresponding to that second highest value is then stored as n at a next step 292, and the second highest value MAX2CYL is next compared at a step 294 to the misfire threshold value determined through the step 372 of the routine of FIG. 10, to be described.

If MAX2CYL exceeds the misfire threshold, then the it is assumed the cylinder n also misfired, and the routine moves to a step 296 to increment a counter MISFCNT(n) which holds a count of the number of misfires in the cylinder n over the present test period, such as the one hundred cycle test period of the present embodiment. Next, the bit n corresponding to the misfiring cylinder n is set in MFSTAT at step 298. In this manner, the present embodiment of the invention is capable of detecting and recording up to two misfires per engine cycle. Accordingly, two misfire counters will have been incremented through the present execution of the routine of FIGS. 8a and 8b and two bits will be set in the misfire status word MFSTAT, one bit representing the cylinder corresponding to the highest acceleration spike value over the selected four spike values and the other bit representing the cylinder corresponding to the second highest acceleration spike value over the selected four spike values.

After setting bit n in MFSTAT at the step 298, or if the MAX1CYL did not exceed the misfire threshold at the step 282, or if MAX2CYL did not exceed the misfire threshold at the step 294, the routine proceeds to a step 300 to determine if 100 engine cycles of data have been analyzed for the current diagnostic test. Specifically, at the step 300, CYCCNT is compared to 100. If CYCCNT exceeds 100, the current test period is complete and the routine proceeds to a step 302 to store engine speed RPM as ENDRPM, and to store engine load LOAD as end load ENDLOAD, for use later in this misfire diagnostic. The routine then proceeds to a step 304 to set a flag MFTEST, indicating that the current test is complete and the accumulated misfire data may now be analyzed. Next, or if CYCCNT was not set to 100 at step 300, the routine proceeds to the described step 306.

Figure 9:
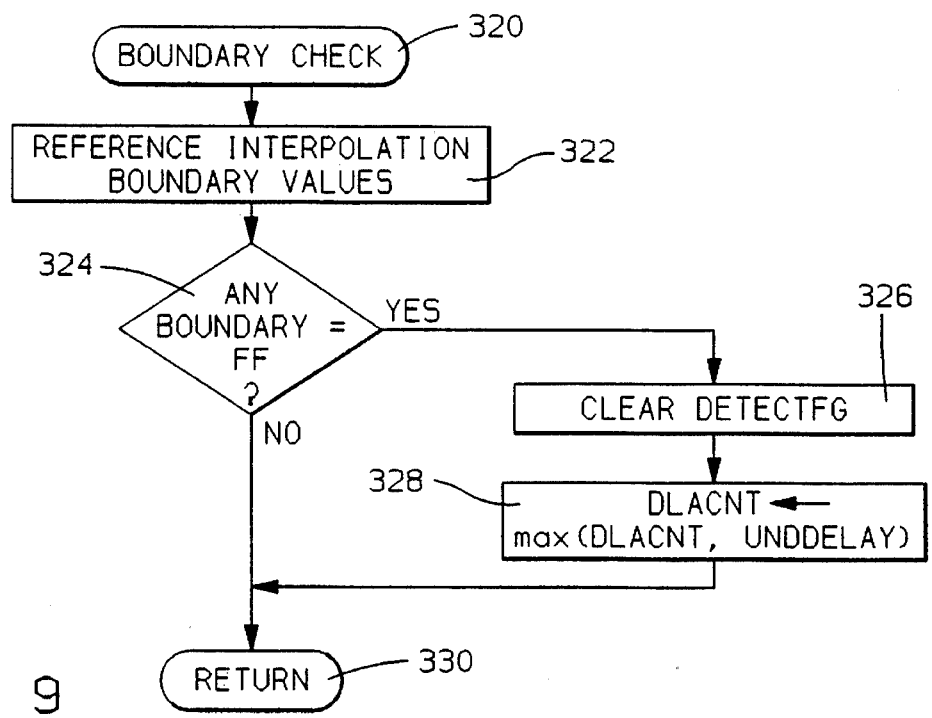

Referring to FIG. 9, a boundary check routine is illustrated, as is called at the described step 226 of FIG. 6. Generally, the boundary check routine of FIG. 9 establishes four boundary values around the misfire threshold value, as was described in FIG. 8a at steps 282 and 294, to which the acceleration spike values are compared in the misfire determination of the routine of FIGS. 8a and 8b. Specifically, the routine of FIG. 9 is entered at a step 320, and proceeds to a step 322 to reference misfire threshold value boundary values between which the misfire threshold value will be determined.

Figure 13:
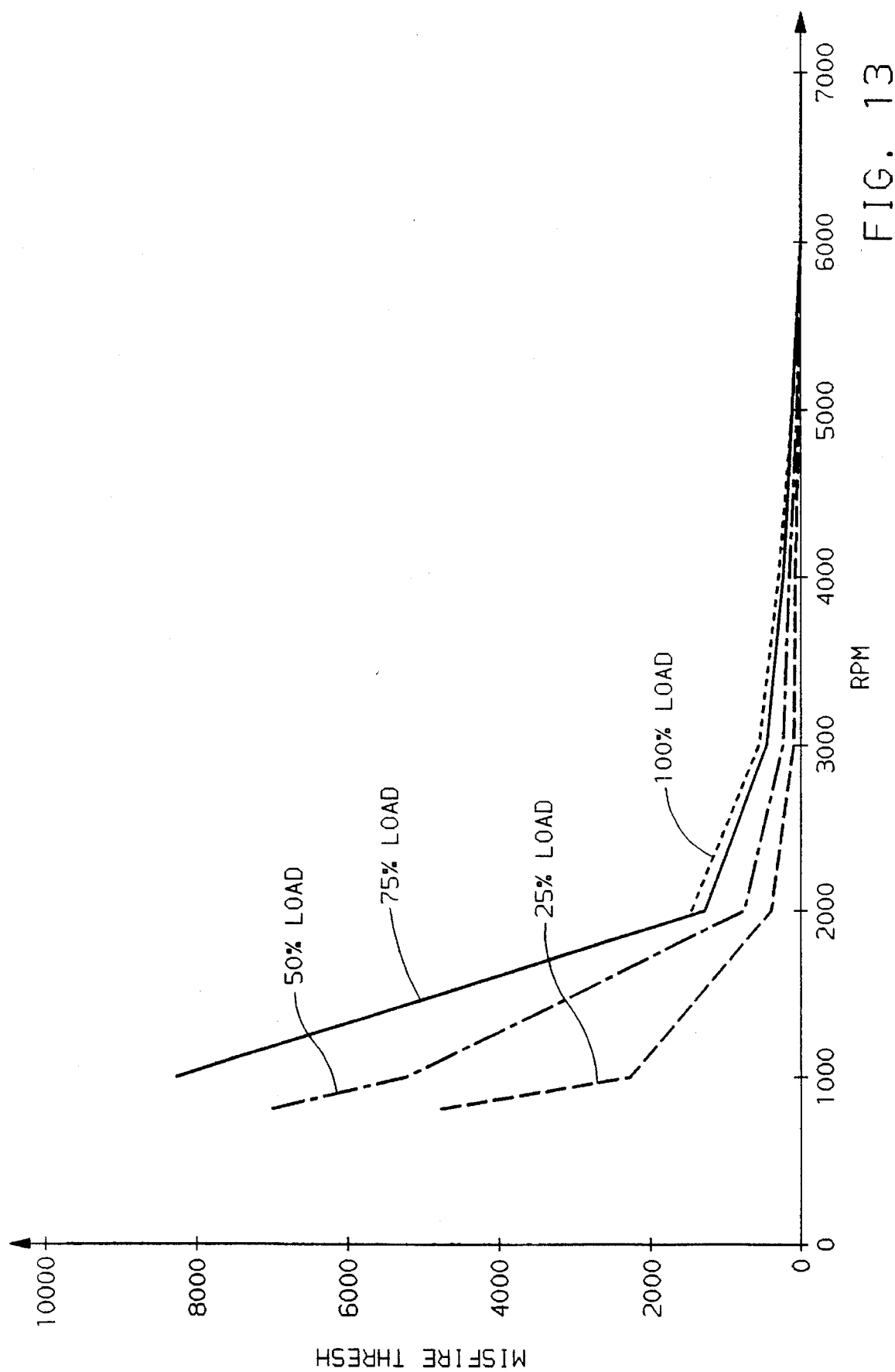
FIG. 13 depicts a relationship between engine parameters and a misfire threshold value as applied in the present embodiment.

In this embodiment, the misfire threshold value is referenced from a predetermined lookup table of values stored as a function of engine speed and engine load. The table values may be determined through a conventional calibration process by determining, for engine speed and load, the magnitude of an acceleration spike value above which a misfire exists in an engine cylinder. Then, at the step 320, the misfire threshold values in the table for the stored table values closest to the present engine speed and load are referenced for interpolation therebetween to determine a present misfire threshold value. For example, the conventional calibration may produce the relationships between engine speed and load and misfire threshold values MISFIRE THRESH illustrated in FIG. 13, which corresponds to the relationships applied in the preferred embodiment hereof. The relationships represented in the FIG. 13 may be incorporated into a conventional lookup table by storing the engine speed RPM and engine load together with the corresponding MISFIRE THRESH as referenced from the FIG. 13 into the table as groups of values. Sets of the three values should be selected and stored in the table so as to span the entire MISFIRE THRESH range of values over the range of such values.

After referencing the table values at the step 322, the routine moves to a step 324 to determine if any of the referenced table values are set to hexadecimal value FF, indicating that the vehicle is currently operating in or next to a calibrated undetectable engine operating region. A region is undetectable if reliable misfire informations cannot be established through the described calibration process for the corresponding engine speed and load, wherein a value equal to hexadecimal FF (decimal 255) will be stored in the lookup table to indicate the undetectable region. If an FF is referenced from the table for the current engine speed and load, the routine moves to a step 326 to clear DETECTFG, indicating the undetectable region. The routine then sets a delay at a step 328, to the larger to the current DLACNT value, or an undetectable region delay value UNDDELAY, which is set to approximately four in this embodiment. Next, or if none of the referenced boundary values indicated an undetectable region at the step 324, the routine moves to a step 330 and returns to the step 226 of FIG. 6.

Figure 10:
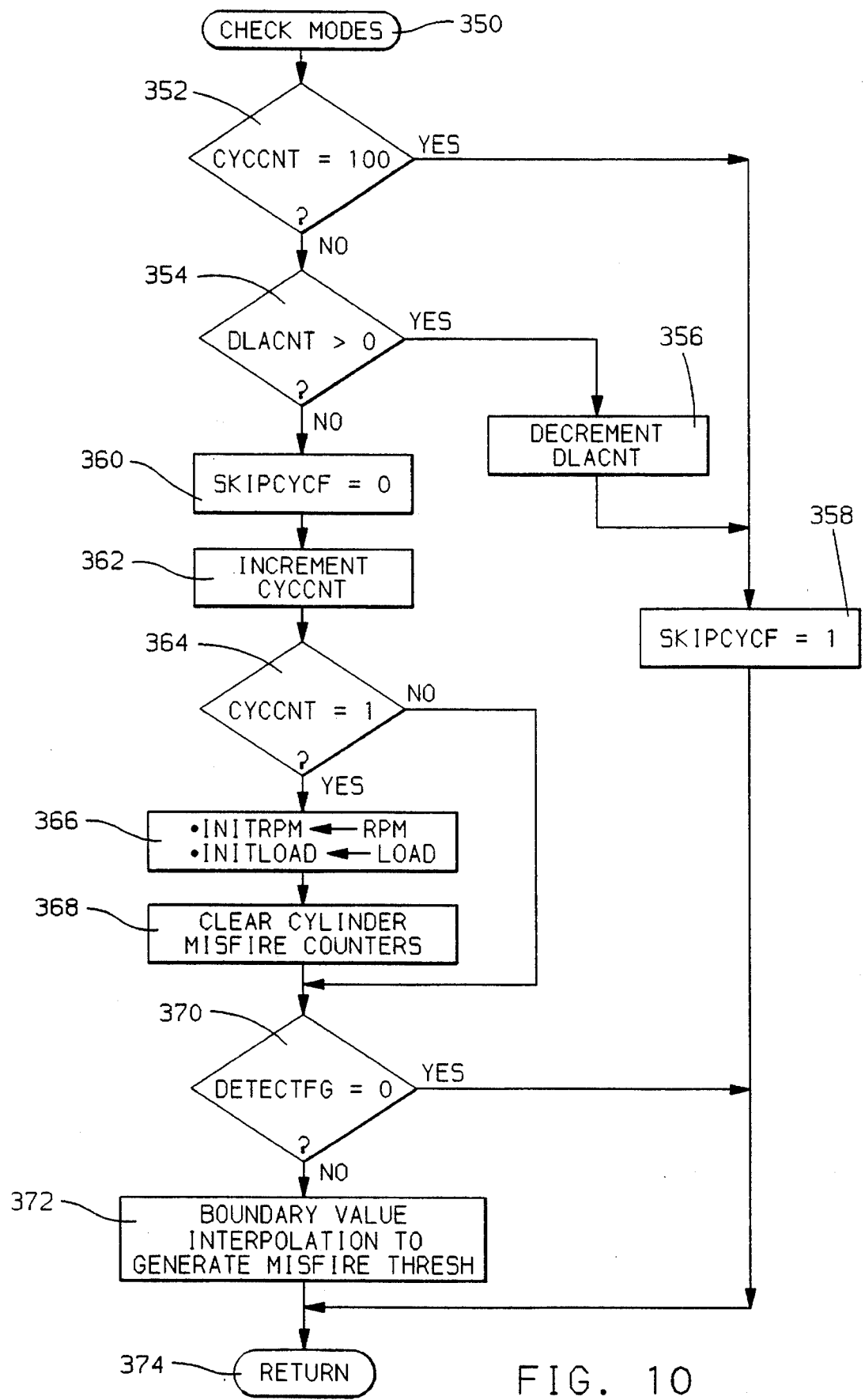

Referring to FIG. 10, a routine to check modes as called at the step 228 of FIG. 6 is illustrated, which is initiated at a step 350 when called, and proceeds to step 352 to determine if the cycle counter CYCCNT is at the end of the test period such that it will be equal to 100. If CYCCNT is equal to 100 at the step 352, the current test period is complete and the routine proceeds to a step 358 to set flag SKIPCYCF to one, and then proceeds to step 374 of the routine of FIG. 10 to return to the routine of FIG. 6, as the modes needs not be checked at the end of the test period of this embodiment.

Alternatively at the step 352, if the cycle count CYCCNT is not equal to 100, the routine of FIG. 10 proceeds to a step 354 to determine if the delay counter is above zero. If the delay count DLACNT is above zero, then a delay that has been established either through the steps of the routine of FIG. 7 or the steps of the routine of FIG. 9 is not yet terminated such that further delay is needed before the misfire diagnostic of this embodiment should continue. In such a case, the routine of FIG. 10 proceeds to a step 356 to decrement the delay counter DLACNT indicating another engine cycle has occurred during the pending delay period, and then proceeds to the described step 358.

Returning to the step 354, if the delay counter is not greater than zero, indicating that any delay period previously established has elapsed, the routine proceeds to a step 360 to set the skip cycle flag SKIPCYCF to zero and then proceeds to increment the cycle counter CYCCNT at a step 362 indicating another engine cycle has occurred during the current misfire diagnostic test period. The routine of FIG. 10 then proceeds to a step 364 to determine if cycle count is set to one, indicating that the current engine cycle is the first in the test period of 100 engine cycles of this embodiment. If cycle counter is equal to one, then some initialization steps are required in this embodiment including the steps described at step 366 of storing current engine speed RPM as INITRPM in computer memory for later use, and storing current engine load LOAD as INITLOAD in computer memory for later use in this embodiment.

The next step executed for initialization is to clear all misfire counters at a step 368, such as the counters that log any misfires in each of the engine cylinders during the 100 cycle test period of this embodiment Next or if the cycle counter was determined to not be set to one at the step 364, the routine proceeds to a step 370 to determine if the detect flag DETECTFG is clear. The detect flag, as was set at the conditional step 326 of FIG. 9, indicates whether the current engine operating region is one in which the misfires of the engine are calibrated to be detectable. If the detect flag is clear at the step 370, the misfires are assumed to not be currently detectable, and the routine proceeds to the described step 374.

Alternatively, if the detect flag is set to one at the step 370, the routine proceeds to a step 372 to interpolate between the values referenced in the routine of FIG. 9 to generate a misfire threshold value, such as by employing well-known interpolation techniques. After generating the misfire threshold value at the step 372, the routine of FIG. 10 proceeds to the described step 374.

Figure 11:
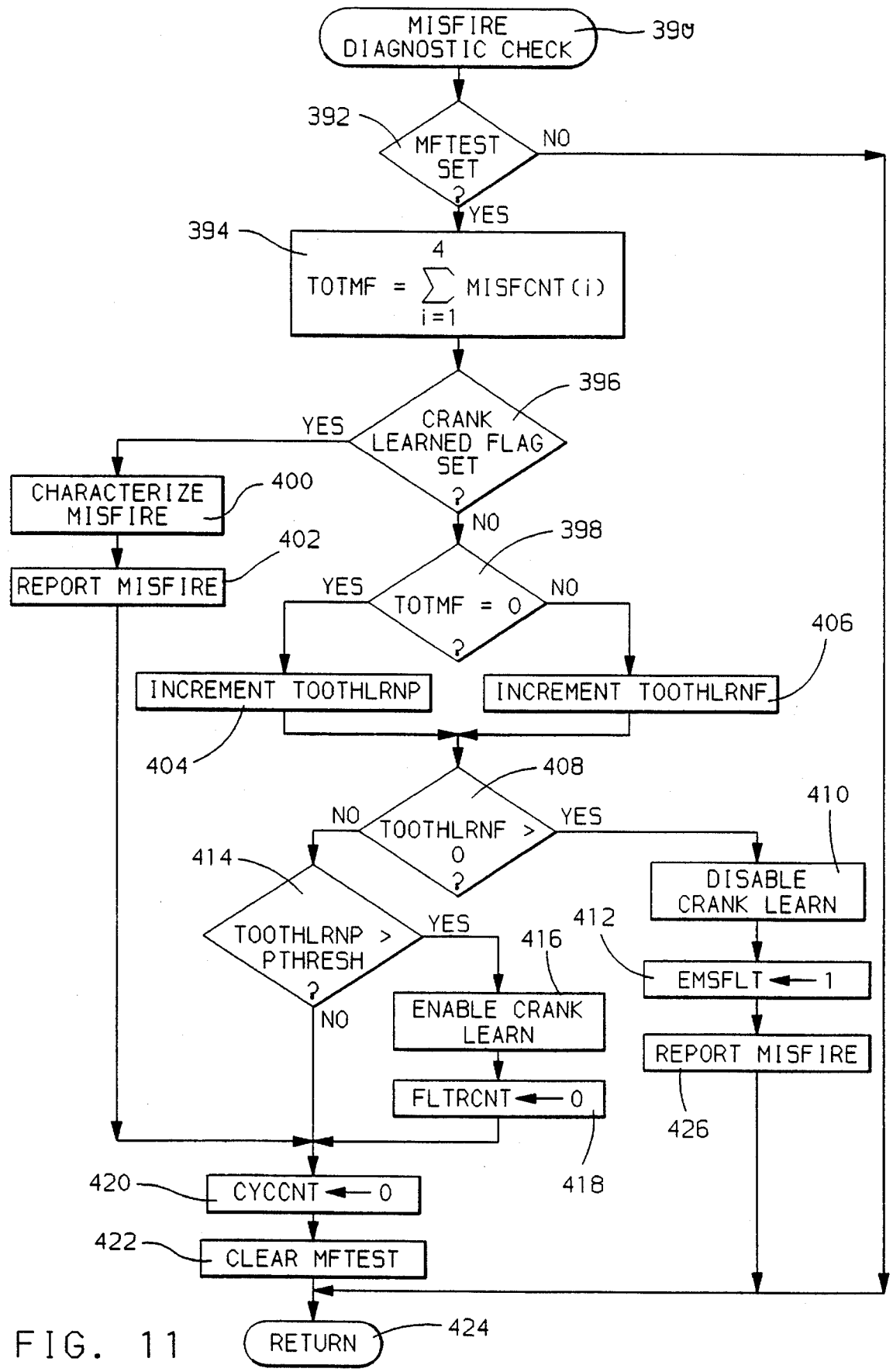

Referring to FIG. 11, a misfire diagnostic check routine is illustrated, such as may be called periodically while the engine is running, for example every 10 milliseconds of engine operation. A conventional time-based controller interrupt may be established so that upon occurrence of the interrupt, the controller may execute the routine of FIG. 11. The routine of FIG. 11 generally carries out a diagnostic check at the end of every test period of the present embodiment, to summarize and categorize misfire diagnostic test results for that test period.

Specifically, upon occurrence of the time-based controller interrupt, the routine of FIG. 11 is executed starting at a step 390 and proceeding to a step 392 at which the misfire test flag is analyzed. If the flag is not set, indicating the current test period is not complete, the routine proceeds to a step 424 to return to any prior controller operations that were ongoing at the time of the current time-based interrupt that evoked the routine of FIG. 11.

Figure 12:
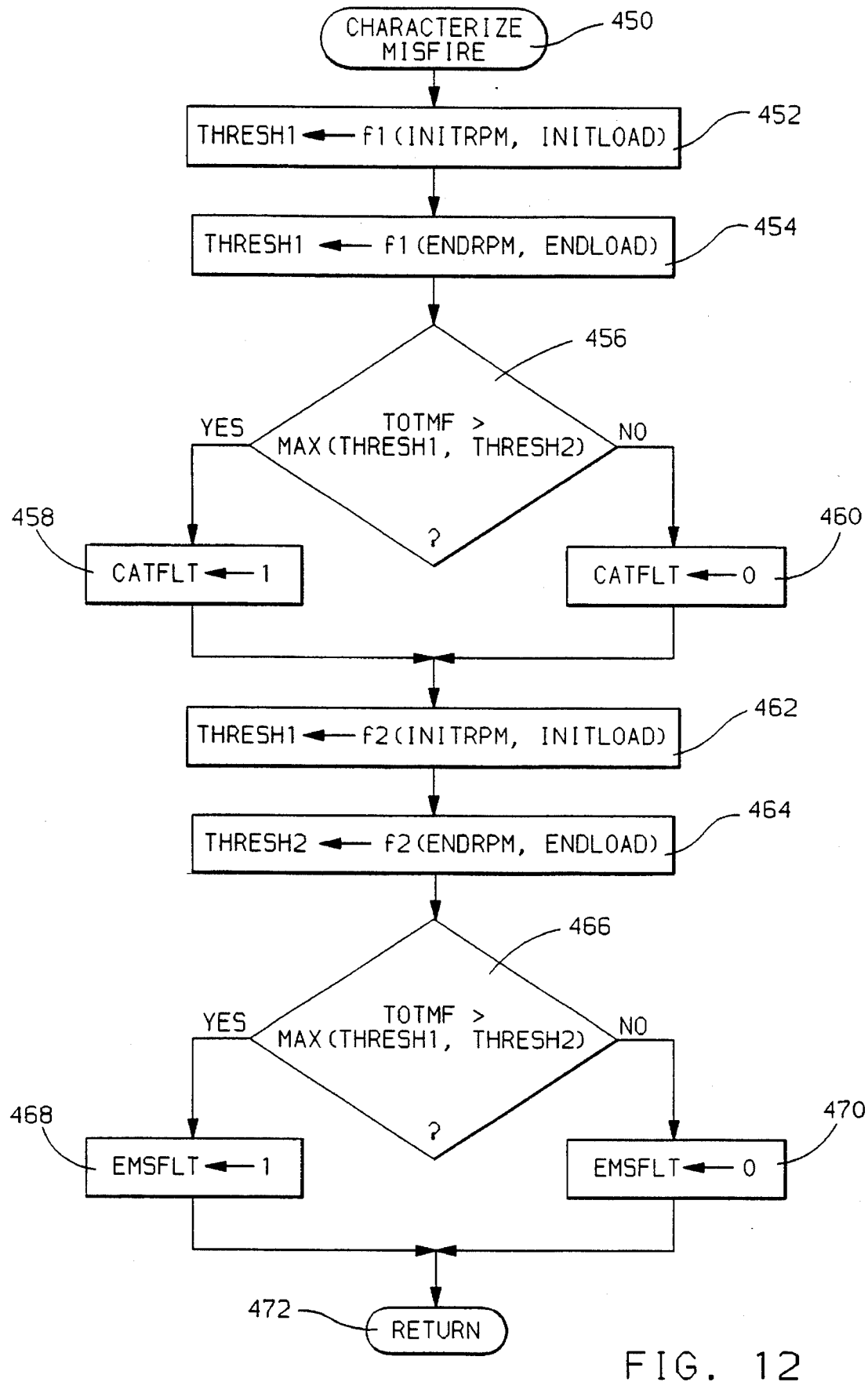

Alternatively at the step 392, if MFTEST is set, the routine proceeds to a step 392 to sum the misfires counted for each of the four cylinders of the engine of this embodiment from the four corresponding misfire counters. The sum of all counted misfires for all of the four cylinders is stored as TOTMF. After summing the misfires at the step 394, the routine proceeds to a step 396 to determine if the crank learn flag has been set. If so, the routine is prepared to go on and characterize the summed up misfire information by proceeding to a step 400, at which a routine to characterize misfires, illustrated in FIG. 12, is called.

Next, the routine moves to a step 402 to report any misfire information that may have been characterized at the step 400. Specifically, the misfire reporting may take place in a number of conventionally known reporting formats. For example, information on misfires may be stored in controller non-volatile memory, or may be indicated via a conventional display device, for example one located on the instrument panel of the vehicle, to alert the vehicle operator of the misfire status.

The reported misfire at the step 402 may include information on the misfiring cylinders and the degree or character of the misfires detected. The inventors intend that the misfire reporting at the step 402 may take place in accord with conventional misfire or engine diagnostic reporting approaches. After reporting the misfire information at the step 402, the routine proceeds to a step 420, to be described. Returning to the step 396, if the crank learn flag is not set, indicating that the crank tooth error information has not been incorporated into the misfire detection information of the most recent test cycle, then any available misfire diagnostic information pertains to idle misfire, as only idle misfire diagnostics are carried out without crank tooth error information. In other words, as described in the routine of FIG. 7, the misfire diagnostic of this embodiment does not operate without crank tooth error information unless at or close to an engine idle condition at which reliable diagnostic information is available without tooth error correction.

Returning to FIG. 11, idle misfire information is analyzed by moving from the step 396 to a step 398, to determine TOTMF is equal to zero indicating no idle misfires recorded over the test period of 100 engine cycles. IF TOTMF equals zero, the routine moves to a step 404 to increment a counter TOOTHLRNP, and otherwise moves to a step 406 to increment a counter TOOTHLRNF if TOTMF is greater than zero. After incrementing either TOOTHLRNP or TOOTHLRNF, the routine moves to a step 408, to determine if TOOTHLRNF is greater than zero, indicating that idle misfires have been detected. If TOOTHLRNF is greater than zero, the routine moves to a step 410, to disable crank learning, as such learning should not take place during any misfire condition.

The routine next moves to a step 412 to set a misfire indicator flag EMSFLT to one, indicating a misfire has occurred the severity of which may cause a measurable increase in engine emissions. The flag EMSFLT may be stored in controller non-volatile memory. The routine next proceeds to a step 426 to report the idle misfire, such as in the manner described at the step 402, and then moves to the described step 424.

Returning to the step 408, if TOOTHLRNF is not greater than zero, the routine moves to a step 414, to determine if TOOTHLRNP is greater than a predetermined threshold value PTHRESH, set to four in this embodiment representing four 100 cycle tests or equivalently 800 engine revolutions. If TOOTHLRNP is greater than PTHRESH, a sufficient number test periods were completed at idle without a misfire that the tooth learning of the present embodiment may be carried out. Accordingly, the routine moves to a step 416 to enable crank learning, such as by setting an appropriate flag in controller memory, and then moves to a step 418 to clear FLTRCNT, the count of the number of TUTHPCTR values that will go into the learned correction value, as described in FIG. 5.

Next, or if TOOTHLRNP was not greater than PTHRESH at the step 414, the routine moves to a step 420 to reset CYCCNT to zero, to prepare for the next 100 cycle test period, and then moves to a step 422 to clear the flag MFTEST, which will not be set until the end of the next test period. The routine then moves the described step 424.

The routine to characterize misfires is called at the step 400 of the routine of FIG. 11, is illustrated in the FIG. 12, and is entered upon being called at a step 450. The routine moves first to steps 452–460, to determine the impact of any counted misfires on the performance or health of a conventional catalytic converter (not shown) through which the emissions of engine 10 (FIG. 1) may pass. Specifically, the routine moves to a step 452 to reference THRESH1, a catalytic converter damage misfire count threshold value, as a function f1 of INITRPM, and INITLOAD, the speed and load respectively of the engine 10 (FIG. 1) at the start of the most recent test period. Values for THRESH1 may be stored for engine speed-load pairs in a conventional lookup table, and referenced therefrom by a generally-known interpolation routine between the two speed-load pairs surrounding INITRPM and INITLOAD.

Individual THRESH1 values may be arrived at by determining a total misfire count of all cylinders over a 100 engine cycle test period that would potentially cause substantial damage to a catalytic converter through which the engine exhaust gas passes. The total count may be determined as a function engine speed and load by setting the speed and load to each of a series of predetermined values and, at each setting, determining the total count needed to potentially cause substantial damage to the catalytic converter, such as damage that would significantly reduce the performance of life of the converter.

Returning to FIG. 12, after referencing THRESH1, the routine moves to a step 454 to reference THRESH2, a second catalytic converter damage misfire count threshold value, using the conventional lookup table described for referencing THRESH1, and using a second lookup speed-load pair, namely ENDRPM and ENDLOAD, the speed and load of the engine measured at the engine of the most recent test period. Accordingly, two threshold values for determining the impact of the count of any diagnosed misfires of the catalytic converter are provided. The inventors intend that a variety of different determinations may be substituted for those of the present embodiment for determining the impact on the converter. The use of speed-load pairs at the beginning and end of the test period are preferred due to their simplicity and their rough representation of the speed and load over the test period.

After determining THRESH1 and THRESH2, the routine move to a step 456, to compare the larger of the two thresholds to TOTMF. If TOTMF exceeds the larger of the two thresholds at the step 456, a catalytic converter impact misfire condition is assumed to be present, and the routine moves to a step 458, to indicate the condition by setting a catalytic converter fault flag CATFLT to one. Alternatively, if TOTMF does not exceed the larger of the two, the routine moves to a step 460, to clear CATFLT. After setting or clearing CATFLT, the routine moves to steps 462–470, to determine the potential emissions impact of any counted misfires.

Specifically, the routine moves to a step 462, to reference an emissions impact threshold value, called THRESH1 for simplicity, as a function f2 of, INITRPM, and INITLOAD, the speed and load respectively of the engine 10 (FIG. 1) at the start of the most recent test period. Values for THRESH1 may be stored for engine speed-load pairs in a conventional lookup table, and referenced therefrom by a generally-known interpolation routine between the two speed-load pairs surrounding INITRPM and INITLOAD.

Individual THRESH1 values may be arrived at by determining a total misfire count of all cylinders over a 100 engine cycle test period that would potentially cause a substantial increase in engine emissions. The total count may be determined as a function of engine speed and load by setting the speed and load to each of a series of predetermined values and, at each setting, determining the total count needed to potentially cause a substantial increase in engine emissions.

Returning to FIG. 12, after referencing THRESH1, the routine moves to a step 464 to reference THRESH2, a second emissions misfire count threshold value, using the conventional lookup table described for referencing THRESH1, and using a second lookup speed-load pair, namely ENDRPM and ENDLOAD, the speed and load of the engine measured at the engine of the most recent test period. Accordingly, two threshold values for determining the impact of the count of any diagnosed misfires on engine emissions are provided. The inventors intend that a variety of different determinations may be substituted for those of the present embodiment for determining the impact on emissions. The use of speed-load pairs at the beginning and end of the test period are preferred due to their simplicity and their rough representation of the speed and load over the test period.

After determining THRESH1 and THRESH2, the routine moves to a step 466, to compare the larger of the two thresholds to TOTMF. If TOTMF exceeds the larger of the two thresholds, a misfire condition is assumed to have been detected that significantly impacts engine emissions, and the routine indicates the condition by setting emissions fault flag EMSFLT to one at the step 468. Otherwise, if TOTMF is not greater that the larger of the two thresholds at the step 46, the routine clears the emissions fault flag EMSFLT at the step 470. After either clearing or setting the flag EMSFLT, the routine of FIG. 12 proceeds to a step 472, to return to the step 400 of the routine of FIG. 11 from which it was called.

The preferred embodiment for the purpose of explaining this invention is not to be taken as limiting or restricting the invention since many modifications may be made through the exercise of skill in the art without departing from the scope of the invention.

The embodiments of the invention in which a property or privilege is claimed are described as follows:

1. A method for diagnosing misfires in an automotive internal combustion engine having an output shaft with a predetermined number of spaced reference points and a predetermined desired spacing between the predetermined number of spaced reference points, comprising the steps of:

sensing a rate of rotation between consecutive sets of the reference points on the output shaft;

sensing a magnitude of a transient rate of rotation characterized by a decrease in the rate of rotation followed by an increase in the rate of rotation;

estimating an actual spacing between the predetermined number of spaced reference points;

generating a spacing error as a difference between the desired spacing and the estimated actual spacing;

generating a transient condition correction value as a predetermined function of the spacing error;

adjusting the sensed magnitude of the transient rate of rotation in accord with the generated transient condition correction value;

comparing the adjusted sensed magnitude to a predetermined misfire threshold value; and detecting an engine misfire when the adjusted sensed magnitude exceeds the misfire threshold value.

2. The method of claim 1, wherein the step of detecting an engine misfire further comprises the steps of:

attributing the sensed transient rate of rotation to a responsible cylinder a cylinder event of which significantly contributed to the sensed transient rate of rotation when the adjusted sensed magnitude exceeds the misfire threshold value;

adjusting a misfire counter corresponding to the responsible cylinder; and indicating the detected misfire when the adjusted misfire counter exceeds a predetermined counter threshold value.

3. The method of claim 1, further comprising the steps of:

sensing engine speed;

sensing engine load; and wherein at least a predetermined one of the group including the predetermined misfire threshold value and the predetermined counter threshold value is determined as a predetermined function of sensed engine speed and sensed engine load.

4. A method for diagnosing misfires in an automotive internal combustion engine over a test period including a predetermined number of engine cycles, wherein the engine has a plurality of cylinders and a corresponding plurality of misfire counters and the engine cycle is defined to include a combustion event for each of the plurality of cylinders, comprising the steps of:

for each of the predetermined number of engine cycles, (a) for each of the plurality of cylinders, sensing the magnitude of an engine speed transient corresponding to the cylinder wherein the engine speed transient is characterized by an engine speed decrease in a first predetermined reference period followed by an engine speed increase in a second predetermined reference period following the first predetermined reference period;

(b) determining a largest sensed engine speed transient magnitude over the engine cycle;

(c) comparing the determined largest magnitude to a predetermined threshold value;

(d) identifying the cylinder corresponding to the determined largest magnitude when the determined largest magnitude exceeds the predetermined threshold value;

(e) adjusting the counter corresponding to the identified cylinder when the determined largest magnitude exceeds the predetermined threshold value;

upon completion of the test period, comparing each of the plurality of counters to a predetermined count threshold value; and indicating a misfire in any of the plurality of cylinders having a corresponding counter that, upon completion of the test period, exceeds the predetermined count threshold value.

5. The method of claim 4, further comprising the steps of:

further, for each of the predetermined number of engine cycles, (a) determining a second largest magnitude as a second largest sensed engine speed transient magnitude over the engine cycle;

(b) comparing the second largest magnitude to the predetermined threshold value;

(c) identifying the cylinder corresponding to the second largest magnitude when the second largest magnitude exceeds the predetermined threshold value; and (d) adjusting the counter corresponding to the identified cylinder when the second largest magnitude exceeds the predetermined threshold value.

6. The method of claim 4, further comprising the steps of:

sensing engine speed;

sensing engine load;

and wherein at least a predetermined one of the group consisting of the predetermined threshold value and the predetermined count threshold value is determined as a predetermined function of engine speed and engine load.

7. A misfire detection method for an automotive internal combustion engine having a plurality of cylinders and having an output shaft with a predetermined number of spaced reference points about the shaft and with a predetermined desired spacing between the predetermined number of reference points about the shaft, comprising the steps of:

sensing engine speed;

sensing a deceleration magnitude as a magnitude of an engine speed decrease over a first reference period;

sensing an acceleration magnitude as a magnitude of an engine speed increase over a second reference period following the first reference period;

estimating an actual spacing between the predetermined number of spaced reference points about the shaft;

calculating a spacing error as a difference between the predetermined desired spacing and the estimated actual spacing;

determining an engine speed transient correction value as a predetermined function of the calculated spacing error;

generating an engine speed change value as a predetermined function of the sensed deceleration magnitude, the sensed acceleration magnitude and the calculated spacing error to correct the engine speed change value in accord with the calculated spacing error;

comparing the generated engine speed change value to a predetermined threshold value;

sensing occurrence of an engine speed transient when the engine speed change value exceeds the predetermined threshold value;

attributing the sensed engine speed transient to a responsible one of the plurality of cylinders, wherein a cylinder event of the responsible one contributed primarily to the occurrence of the engine speed transient;

adjusting a transient count value to indicate the sensed occurrence; and detecting a misfire when the transient count value exceeds a predetermined count threshold value.

* * * * *